United States Patent
Reddehase et al.

(10) Patent No.: US 10,875,572 B2
(45) Date of Patent: Dec. 29, 2020

(54) STEERING OR TRACK ROD HAVING AN INTEGRAL CONNECTING PIPE

(71) Applicant: ZF Friedrichshafen AG, Friedrichshafen (DE)

(72) Inventors: Günter Reddehase, Brockum (DE); Jens Eismann, Melle (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 205 days.

(21) Appl. No.: 15/747,914

(22) PCT Filed: Jun. 28, 2016

(86) PCT No.: PCT/EP2016/064900
§ 371 (c)(1),
(2) Date: Jan. 26, 2018

(87) PCT Pub. No.: WO2017/016773
PCT Pub. Date: Feb. 2, 2017

(65) Prior Publication Data
US 2018/0229766 A1 Aug. 16, 2018

(30) Foreign Application Priority Data

Jul. 28, 2015 (DE) .................. 10 2015 214 248

(51) Int. Cl.
*B62D 7/20* (2006.01)
*B21D 53/88* (2006.01)
(Continued)

(52) U.S. Cl.
CPC .............. *B62D 7/20* (2013.01); *B21D 39/04* (2013.01); *B21D 53/88* (2013.01); *B60G 7/003* (2013.01);
(Continued)

(58) Field of Classification Search
CPC . B62D 7/20; B62D 7/16; B21D 53/88; B60G 2206/11; F16C 2326/24; F16C 2326/05; F16C 7/02
See application file for complete search history.

(56) References Cited

U.S. PATENT DOCUMENTS 2,734,760 A * 2/1956 Marquis ................. A01B 69/00
403/56
4,138,141 A   2/1979 Andersen
(Continued)

FOREIGN PATENT DOCUMENTS

DE           731554 C  * 2/1943  ............... B62D 7/20
DE       199 00 264 A1   7/2000
(Continued)

OTHER PUBLICATIONS

Machine language translation of DE 102006040072 obtained from espacenet.com Mar. 12, 2020.*
(Continued)

*Primary Examiner* — Ruth Ilan
(74) *Attorney, Agent, or Firm* — Davis & Bujold PLLC; Michael J. Bujold

(57) ABSTRACT

A connecting tube for connecting two joint attachments of a steering or track rod. The connecting tube is reinforced by at least one tube section connected by friction force to the connecting tube such that either the entire outer or inside wall the tube section is in contact against a wall of the connecting tube, thereby forming a press fit connection. The steering or the track rod has a connecting tube with end sections that each hold or support components of joint attachments. A method for producing a connecting tube or the steering or the track rod in which first a tube semifabricate of the tube section is positioned within a tube semifabricate of the connecting tube and then the two tube semifabricates are expanded within a connection zone by a (Continued)

mandrel with an oversized section that is moved along the common axial direction of the two tube semifabricates.

16 Claims, 6 Drawing Sheets

(51) Int. Cl.
  *B60G 9/00* (2006.01)
  *B60G 7/00* (2006.01)
  *B21D 39/04* (2006.01)

(52) U.S. Cl.
  CPC .......... *B60G 9/00* (2013.01); *B60G 2204/416* (2013.01); *B60G 2206/11* (2013.01); *B60G 2206/8207* (2013.01); *B60G 2206/82092* (2013.01); *F16C 2326/05* (2013.01); *F16C 2326/24* (2013.01)

(56) References Cited

U.S. PATENT DOCUMENTS

| | | | | |
|---|---|---|---|---|
| 4,887,486 A | * | 12/1989 | Wood, Jr. | B60G 7/005 |
| | | | | 74/588 |
| 5,664,327 A | * | 9/1997 | Swars | B21D 39/04 |
| | | | | 29/421.1 |
| 6,579,025 B1 | | 6/2003 | Sokolihs et al. | |
| 6,817,382 B2 | | 11/2004 | Tanaka et al. | |
| 7,001,076 B2 | | 2/2006 | Lustig et al. | |
| 8,702,112 B1 | * | 4/2014 | Belleau | B62D 7/20 |
| | | | | 280/89.12 |
| 2003/0074778 A1 | * | 4/2003 | Takeuchi | B21C 37/16 |
| | | | | 29/456 |
| 2006/0108783 A1 | | 5/2006 | Ni et al. | |

FOREIGN PATENT DOCUMENTS

| | | | |
|---|---|---|---|
| DE | 102 23 306 A1 | 12/2003 | |
| DE | 103 51 463 A1 | 6/2005 | |
| DE | 10 2006 040 072 A1 | 2/2008 | |
| DE | 10 2012 018 189 A1 | 5/2014 | |
| EP | 1 205 319 A2 | 5/2002 | |
| FR | 2 521 919 A1 | 8/1983 | |
| FR | 2 865 990 A1 | 8/2005 | |
| GB | 488 531 | 7/1938 | |
| GB | 2 069 945 A | 9/1981 | |
| GB | 2 455 443 A | 6/2009 | |
| JP | 2002327729 A | * 11/2002 | ................ F16C 7/08 |

OTHER PUBLICATIONS

German Search Report Corresponding to 10 2015 214 248.5 dated Nov. 17, 2016.
International Search Report Corresponding to PCT/EP2016/064900 dated Dec. 6, 2016.
Written Opinion Corresponding to PCT/EP2016/064900 dated Dec. 6, 2016.
International Preliminary Report on Patentability Corresponding to PCT/EP2016/064900 dated Nov. 27, 2017.

* cited by examiner

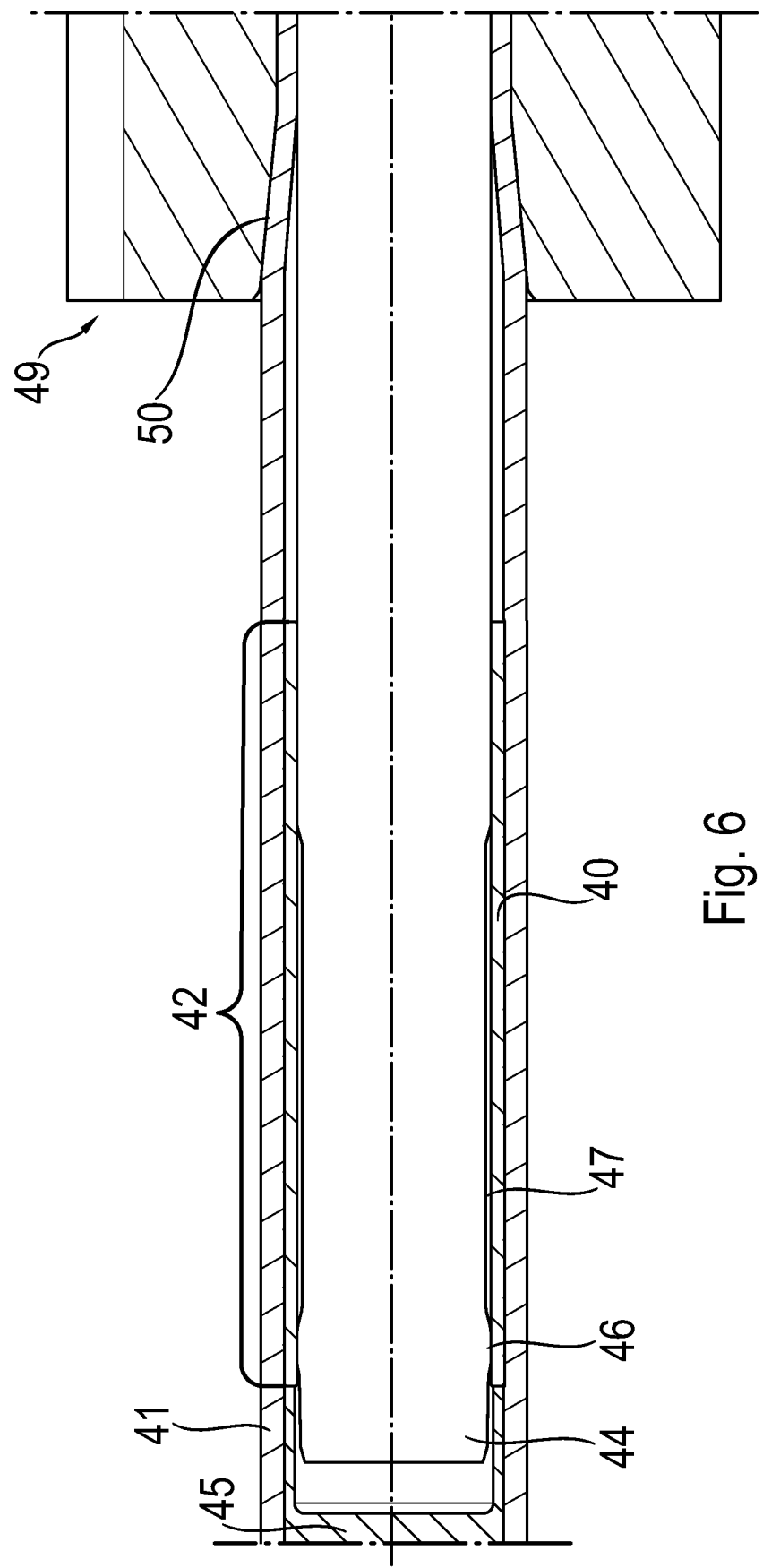

STEERING OR TRACK ROD HAVING AN INTEGRAL CONNECTING PIPE

This application is a National Stage completion of PCT/EP2016/064900 filed Jun. 28, 2016, which claims priority from German patent application serial no. 10 2015 214 248.5 filed Jul. 28, 2015.

FIELD OF THE INVENTION

The invention concerns a steering or track rod having an integral connecting tube and a method for producing such a steering rod or track rod.

BACKGROUND OF THE INVENTION

Connecting tubes that connect two joint attachments of a steering rod or a track rod to one another are known from the prior art. DE 103 51 463 A1 discloses a steering linkage, also called a steering assembly, for a utility vehicle, in particular a heavy utility vehicle. The steering linkage comprises a steering rod, also called a steering thrust-rod, and a track rod. The steering rods directed essentially in the longitudinal direction of the vehicle and the track rods directed essentially in the transverse direction of the vehicle are functionally connected by means of lever arrangements. The track rod comprises an essentially straight connecting tube. The steering rod comprises a curved connecting tube, in order to avoid a collision with an adjacent vehicle wheel during a steering deflection.

From GB 488 531 A a steering rod with a multi-component connecting tube is known, wherein the connecting tube is formed by tube sections nested in one another.

DE 10 2006 040 072 A1 describes a motor vehicle hollow section with a protective coating, which is formed around a component produced by high internal pressure forming.

In the installed condition steering rods or track rods with a straight connecting tube can undergo tensile, compression or buckling loads or even a superimposition of more than one of these load types. With straight steering rods or track rods, for example when a vehicle drives against a curbstone at an acute angle between the vehicle wheel and the curbstone as seen from above the utility vehicle, high wheels forces can be imposed on the steering rod. In such a case there is a risk that the straight connecting tube may buckle. In accordance with the theory of the buckling of thin rods according to Euler, this buckling often takes place in the middle of the length of the steering rods or track rods. Curved steering rods or track rods, in addition to tensile, compression or buckling loads, may also be exposed to bending loads and to a superposition of more than one of the load types. Depending on whether a straight or a curved steering rod or track rod is concerned and which load type or types are imposed at the time, mechanical stresses of varying sizes may occur in the steering or track rods. The dimensions of steering or track rods are in each case designed to avoid failure reliably in the most highly stressed areas. As a result, steering rods or track rods are often oversized in large proportions in relation to their length, and consequently have a relatively high mass.

SUMMARY OF THE INVENTION

The purpose of the present invention is to provided a steering rod or a track rod with an integrated connecting tube whose mass is relatively low and which can nevertheless reliably withstand the mechanical stresses that may occur.

According to the present invention this objective is achieved by a steering rod or track rod having an integrated connecting tube, which also embodies the characterizing features of the independent claims.

Preferred embodiments and further developments are the object of the subordinate claims.

Thus, the invention envisages a steering rod or track rod comprising an integrated connecting tube, such that the end sections of the connecting tube in each case hold parts of two joint attachments. According to the invention, the connecting tube is reinforced in some areas by at least one tube section connected to the connecting tube by friction, in such manner that the outer wall or the inner wall of the tube section is in contact over its entire surface against a wall of the connecting tube, forming a press fit connection therewith.

The length of the at least one tube section is smaller than the length of the connecting tube. The two joint attachments of the steering rod or the track rod are at the ends of the connecting tube. Preferably, the connection tube and the tube section each have a circular cross-section surface. The inside diameter and the outer diameter, the cross-section geometry and the wall thicknesses of the connecting tube and the tube section are preferably constant over their length.

The transmission of a steering movement from a steering wheel to the vehicle wheels takes place in utility vehicles as a rule by way of a steering linkage that in each case comprises at least one track rod and a steering rod. In the context of the invention the track rod, when in its installed position, extends in the utility vehicle at least essentially in the transverse direction of the vehicle and connects a track lever of a wheel carrier on a first side of the vehicle to the track lever of the opposite wheel carrier on the other side of the vehicle. In the context of the invention the steering rod, when installed in the utility vehicle, extends essentially in the longitudinal direction of the vehicle and connects a steering gear system, in particular a lever of a steering gear system, to a steering lever associated with one of the two wheel carriers connected by the track rod.

Preferably, the steering rod or track rod has two end sections of reduced diameter, each with a joint attachment, these joint attachments preferably being in the form of ball joints, in particular radial ball joints. In a joint attachment in the form of a radial ball joint the associated end section of the connecting tube receives a shank of the radial ball joint. Thus, the shank forms the connection piece of the joint attachment arranged at the end of the connecting tube. The shank can be connected detachably or permanently to the end section of the connecting tube, wherein the permanent connection variant is preferably formed with interlock but can also be formed by material merging. For example, the shank can be detachably connected to the end section of the connecting tube by a threaded connection, in which case the shank preferably has an external thread and the end section a corresponding internal thread. However, a threaded connection is also possible which for example is made permanent by crimping. Alternatively, the shank can be connected permanently to the end section of the connecting tube by interlock and friction if it is given a grooved profile. In such a case the grooved profile extends with corresponding shape in the axial direction of the shank and the end section, and in the axial direction has grooves uniformly spaced apart. The grooves can extend all round, or not all round. If the grooves do not extend all round, then in line with DE 102 23 306 A1 they extend, as viewed in a cross-section through the shank and the end section, preferably over two equally large circumferential sections separate from one another and arranged opposite one another, each of these being wider than a quarter but smaller than half of the total circumference.

The grooved profile on the shank can be made by machining or without machining, in particular by primary shaping or by deformation. The grooved profile of the end section of the connecting tube can advantageously be produced with the shank pushed in, in combination with the already formed, shape-matching grooved profile on the shank, by a hot pressing process. The hot pressing process, also known as hot stamping, preferably takes place with a pre-heated end section of the connecting tube. Hot stamping has the advantage that a particularly firm seating between the end section of the connecting tube and the shank of the ball joint is produced because the end section of the connecting tube surrounding the shank shrinks during cooling after the hot stamping and thus grips the shank firmly.

In a housing of the radial ball joint there is arranged a spherical end of a ball stud, which stud extends essentially at a right-angle to the extension direction of the shank. For that reason radial ball joints are often also known as angled ball joints. Alternatively, at least one of the two joint attachments can be in the form of an axial ball joint. It is advantageous for at least one of the joint attachments to be connected displaceably to the connecting tube in the axial direction of its end section, in order to enable fine adjustment of the distance between the two joint attachments. In that case the fine adjustment is carried out by virtue of a thread arrangement which enables an axial displacement of the shank relative to the end section of the connecting tube. After the fine adjustment the set position of the joint attachment relative to the connecting tube can be secured by a clamp surrounding the end section of the connecting tube. In this design the end section of the connecting tube has a number of longitudinal slots in order to enable clamping. Alternatively, for fine adjustment a fine adjustment system according to DE 199 00 264 A1, with an adjustment sleeve having internal and external threads, arranged between the end section of the connecting tube and the shank of the radial ball joint, can be used. Another possibility for securing the position of the joint attachment relative to the connecting tube after the fine adjustment is to clamp the outer thread of the shank against the internal thread of the end section by means of one or more locking nuts.

The at least one tube section can be arranged inside the connection tube in such manner that the entire surface of the outer wall of the tube section rests against the inside wall of the connecting tube. This arrangement has the advantage that the continuous shape of the outer wall of the connecting tube is at the same time the outer circumferential surface of the assembly formed by the connecting tube and the tube section. This is advantageous during transport and assembly, since due to the smooth outer circumferential surface there is less risk of injury. Alternatively the at least one tube section can be arranged on the outside of the connecting tube in such manner that in this design the entire surface of the inside wall of the tube section is in contact against the outer wall of the connecting tube. This design has advantages for the production and quality checking of the assembly consisting of the connecting tube and the tube section, because the press fit connection between them is easily accessible and inspected.

Over its length, the connecting tube extends, in particular, in a straight line. Extending in a straight line means that a notional connection line between the centerlines of the connecting areas of the joint attachments arranged at the two ends of the connecting tube coincides with the centerline of the connecting tube. In other words, the connecting tube can be straight over its full length. The reinforcement of the connecting tube in some areas by means of at least one tube section connected by friction force to the connecting tube is carried out in particular as a function of the loads expected over the length of the connecting tube. Straight connecting tubes for the connection of two joint attachments of a steering rod or a track rod can be subjected to tensile, compression or buckling loads, or even a superimposition of more than one such load type. Straight connecting tubes for the connection of two joint attachments of a steering rod or a track rod are not designed for the transmission of torques and hence for withstanding torsional loads. In a connecting tube which is straight along its length, the tube section is preferably arranged at the center of the connecting tube because if overloaded by pressure forces acting in the longitudinal direction of the connecting tube, the connecting tube often fails by buckling in that central area. In turn, the reinforcement of the central area by a tube section connected by friction to the connecting tube takes place again in such manner that with its outer wall or with its inside wall the tube section is in contact over its entire surface against the inside wall or the outer wall, respectively, of the central area of the straight connecting tube, forming a press fit therewith. In this way the moment of area relevant for Euler's theory of the buckling of thin rods, which is also called the area moment of the $2^{nd}$ order, is increased and so too therefore is the resistance to buckling in the central area of the straight connecting tube.

The partial reinforcement of heavily loaded areas of the connecting tube with one or more tube sections has the advantage that the connecting tube can be made comparatively light, because its cross-section geometry does not all have to be designed for the maximum load on the connecting tube. This enables the mass of the connecting tube to be reduced, which due to the relatively large cross-sectional area and the relatively long component length, especially in the case of steering rods or track rods for utility vehicles such as trucks and buses, is particularly desirable. Due to the use of less material the manufacturing costs can also be reduced. The mass added by the tube section or sections is substantially less than the reduction of the mass of the connecting tube by virtue of the measures described above. Thus, the so-termed unladen weight of the utility vehicle can be reduced and accordingly the payload of passengers or freight can be increased, which besides a further economic advantage also has an environmental advantage due to reduced $CO_2$ emission.

In an alternative design of the invention, the connecting tube has a shape that deviates from a straight line. Deviating from a straight line means that a notional connecting line between the centerlines of the connection areas of the two joint attachments at the two ends of the connecting tube does not coincide completely with the centerline of the connecting tube. The connecting tube can deviate from a straight line over its entire length, or in only a part-section, or in more than one section thereof. The area or areas that deviate from straightness can have a uniform, constant curvature or different radii of curvature. The area or areas that deviate from straightness can lie two-dimensionally in a single plane or be arranged three-dimensionally in more than one plane. To avoid colliding with other components such as steered vehicle wheels, connecting tubes for the connection of two joint attachments of a steering rod or a track rod are often bent, crank-shaped or curved in some other way as made necessary by the design concerned.

In this design too the inside diameter and outer diameter, the cross-section geometry and the wall thicknesses of connecting tubes and tube sections are preferably constant over their length. In this regard, in the areas in which the connecting tube deviates from straightness there can be slight differences. These differences are production-related and occur particularly when the radius of curvature is relatively small and the curvature is produced by bending the connecting tube. Considered theoretically, the connecting tube is a curved rod with a more or less marked curvature, depending on the design, which rod is articulated at its two ends. Consequently it can be loaded in tension, compression or by bending and buckling. There can be no torsional loads.

Preferably, the tube section is arranged in the area of a curved part of the connecting tube. Particularly in the case of connecting tubes that deviate substantially from a straight shape and in the end areas of which higher tensile or compression forces are applied, a relatively high bending load occurs in the curved parts. The effect of tube sections positioned in the area of these curved parts of the connecting tube is that the aforesaid load peaks can be reliably absorbed. This avoids unacceptable deformations of the connecting tube, which can result in unintentional track alignment and hence in greater tire wear.

In an advantageous further development of the invention, in a common connection zone a distance away from the ends of the connecting tube the connecting tube is plastically deformed radially all the way round. The all-round plastic deformation of one of the two joint partners, the connecting tube and the tube section, is advantageous for bringing the tube section with its outer wall or its inside wall into full surface contact that forms a press fit against the inside wall or the outer wall of the connecting tube. Theoretically it could also be proposed to design the diameter tolerances of the connecting tube and the tube section in such manner that to achieve the press-fit connection a press fit is ensured between the connecting tube and the tube section. However, that could only be achieved by virtue of great production complexity and would therefore not be economical. Even to produce the press-fit connection by a shrink fit, by previously heating the joint partner with the larger diameter on the other joint partner, which could additionally be cooled before the two are joined, can in any case only be done at higher cost.

Accordingly, in relation to their respective outer and inside circumferential surfaces that are in contact after the press-fit connection has been formed, in the initial condition the two joint partners, the connecting tube and the tube section, preferably have a clearance fit between them. To produce the press fit, one of the two joint partners, the connecting tube or the tube section, is plastically deformed within the mutual connection zone at a distance away from the ends of the connecting tube, in order to bridge the all-round annular gap present between the connecting tube and the tube section because of the clearance fit. The other of the two joint partners, preferably having a relatively close diameter tolerance which in particular is of an order of magnitude in the range of the elastic deformation capacity of the other of the two joint partners, is only elastically deformed during this. In the connection zone, the tube section can be inside the connecting tube so that after its radial, all-round plastic deformation by expansion its entire surface is in contact with the inside wall of the connecting tube, so forming the press fit connection, or else the diameter of the connecting tube is reduced by all-round plastic deformation within the connection zone so that its entire surface is brought into contact with the outer wall of the tube section. Alternatively, in the initial condition before the press fit is formed the tube section can be positioned on and outside the connecting tube and intimate all-over contact with the respective other joint partner can be produced either by reducing the diameter of the tube section or by expanding the connecting tube within the mutual connection zone.

According to an alternative design of the invention, both the connecting tube and the tube section undergo all-round radial plastic deformation within a mutual connection zone at a distance away from the ends of the connecting tube. Depending on the diameter tolerances of the connecting tube and/or the tube section, it may be that as described earlier the radial all-round plastic deformation of only one of the joint partners, the connecting tube or the tube section, is sufficient. To reinforce the connecting tube in some areas by means of the at least one tube section connected by friction force to the connecting tube, in that case the other joint partner, the connecting tube or the tube section, is only elastically deformed. The radial all-round plastic deformation of both the connecting tube and the tube section within the mutual connection zone at a distance away from the ends of the connecting tube is advantageous if the diameter tolerances of both the connecting tube and the tube section are larger. In that way, within the range from the theoretically smallest possible to the theoretically largest possible clearance between the joint partners, namely the connecting tube and the tube section, the connecting tube can be reliably reinforced in the requisite areas by the at least one tube section connected to it by friction force to form a press fit connection.

Compared with the sections that have not been radially deformed all round, in the connection zone the connecting tube has an enlarged inside and outer diameter or a reduced inside and outer diameter. The transition between the sections of the connecting tube that have not been radially deformed all round and the connection zone of the connecting tube is preferably shaped conically all round. The connection zone extends at least over the length of the curved section. The connection zone can also extend on one or both sides beyond the curved section toward the ends of the connecting tube. In that case, besides a curved part of the connecting tube at least one straight part adjacent to the curved part will additionally be reinforced.

Advantageously, the materials of the connecting tube and the tube section have different yield points. The yield point, as a rule expressed in $N/mm^2$ or MPa, is a characteristic property of the material and denotes that stress up to which, when stressed, the material does not undergo any permanent plastic deformation. Below the yield point the material when unloaded reverts elastically to its original shape, while in contrast, if the yield point is exceeded a plastic change of shape remains. Under tensile stress, as applied when the connecting tube and/or the tube section is/are expanded, the yield point is termed the yield strength. In connection with a compression stress, as applied when the diameter of the connecting tube and/or the tube section is reduced, the yield point is termed the crush limit.

The working principle of the friction-force connection of the connecting tube and the tube section by forming a press fit is based on the different yield points of the joint partners, namely the connecting tube and the tube section. After the press fit has been formed, within the connection zone the tube section is in all-over contact with its outer wall or its inside wall against the inside wall or the outer wall, respectively, of the connecting tube. Prior to that, either the connecting tube or the tube section was loaded elastically up to its yield point and the other of the two joint partners beyond its yield point. Alternatively, both joint partners were previously loaded beyond their respective yield points. Since the loads bring about either only an elastic or both an elastic and a plastic deformation of the connecting tube and/or the tube section, when the load is removed in each case a recovery of the elastic part of the deformation takes place. For the press fit to be made between the tube section and the connecting tube, the material of one of the two joint partners must have a higher yield point, i.e. greater elasticity.

For example, in an arrangement with a tube section surrounding the outer wall of the connecting tube, in order to be able to produce the desired press fit by expanding the two joint partners the material of the tube section must have a higher yield strength than the material of the connecting tube. During the expansion at least the connecting tube undergoes deformation with an elastic and a plastic fraction. After the removal of the deforming force required for the expansion, the outer diameter of the connecting tube decreases by the amount of its elastic deformation. During the expansion of the connecting tube the tube section is loaded either only elastically or elastically and plastically, i.e. beyond its yield strength. After the removal of the deforming force required for the expansion, the inside diameter of the tube section also decreases. Due to the higher yield strength of the tube section material compared with the connecting tube material, when the deforming force required for expansion is removed, within the connection zone the tube section springs back more than the connecting tube. Thus, after the removal of the deforming force required for the expansion the inside diameter of the tube section would decrease more than the outer diameter of the connecting tube in contact all over its surface if the tube section had not been prevented from being fully relaxed because of the smaller spring-back of the connecting tube. This results in a clamping action, which within the connection zone produces a frictional connection between the connecting tube and the tube section, with the formation of a press fit connection.

The connecting tube and the tube section are preferably made from the same material, in particular steel. The materials of the joint partners, the connecting tube and the tube section, are preferably chosen the same in order to avoid loosening or release of the press fit connection between the joint partners, the connecting tube and tube section, under the influence of temperature. If different materials were used for the connecting tube and the tube section, then depending on the thermal expansion coefficients of the materials chosen, at temperatures above or below the temperature at which the connecting tube and the tube section were joined the press fit between the two joint partners could become loose or detached.

In a preferred embodiment of the invention the material of the connecting tube has a higher yield strength than the material of the tube section. In such a case the press fit can be produced by arranging the tube section inside the connecting tube and expanding both of the joint partners. This design is particularly advantageous when the tube section is arranged in the area of a curved part of the connecting tube, since because the tube section is on the inside the outer wall of the connecting tube is at least essentially smooth so that the bending of the connecting tube to produce its curved part is made more simple. In such a case the yield strength of the connecting tube material can for example have the value 460 MPa and that of the tube section material the value 355 MPa. The difference between the two yield strengths is then 105 MPa. By choosing material pairs with an even larger yield strength difference, the reliability when forming the frictional press fit can be further increased.

The larger the yield strength difference, the greater is the difference between the theoretical spring-back distances, after the press fit has been formed, when the joint partners, the connecting tube and the tube section, have theoretically been able to relax by their respective elastic deformation fractions. After the expansion of the connecting tube and the tube section within the connection zone and the subsequent removal of the joining force used for the expansion, the tube section would spring back in its diameter by a smaller amount than the connecting tube would have if during the formation of the press fit with the tube section it had not been prevented from relaxing completely. One could speak of an overlap due to the different paths covered by the tube section during its relaxation after the joint formation and that covered by the connecting tube if it had not been prevented by the tube section from doing so. In that sense a relatively large overlap is particularly advantageous when the tube section is positioned in a curved part of the connecting tube, because during the production of the curved part by plastic deformation the amount of the overlap could be reduced in some areas. If the material of the connecting tube has a higher yield strength than the material of the tube section, the frictional press fit connection can alternatively also be produced if the tube section surrounds the connecting tube and the diameter of both joint partners together is reduced.

Preferably, the wall thickness of the tube section is smaller than that of the connecting tube. The tube section serves to absorb load peaks along the connecting tube. Accordingly, it is sufficient to make the tube section with a wall thickness smaller than the wall thickness of the connecting tube. The greater part of the loads occurring is taken up by the connecting tube. The length of the at least one tube section is smaller, in particular considerably smaller than the length of the connecting tube. If the tube section is arranged in the area of a curved part of the connecting tube, then due to the smaller wall thickness of the tube section compared with the connecting tube the bending of the connecting tube to form the curved part is simplified. In relation to its inside and outer diameters and its wall thickness, the connecting tube preferably has standard dimensions, since tube material with standard dimensions can be obtained more easily than material with special dimensions and because due to its greater length compared with the tube section, more of it is needed. If necessary, due to the smaller amount needed, tube material with special dimensions is preferably used for the tube section.

According to a further development of the invention at least one end section of the connecting tube is made with a reduced diameter. The end section of reduced diameter serves for the attachment of the connecting tube to a component connected thereto. The end section is not reinforced by a tube section and can have an outer circumferential surface like the outer surface of a cylinder. Leading into the at least one end section with a reduced diameter the connecting tube preferably has a transition of conical shape all round. The connection zone and the end section are preferably a distance apart from one another. The end section of reduced diameter can have an internal thread, which extends in particular over the full length of the end section. Furthermore, the end section can have one or more longitudinal slots, which in combination with a clamp are suitable for the radial clamping of the end section. Preferably, two diametrically opposite slots are provided, which pass through the outer cylindrical surface of the end section in a plane in the axial direction. Longitudinal slots designed in that way can be easily produced in a single working step by sawing. The end of the connecting tube opposite the end section of the connecting tube with the reduced diameter can be cut to length while maintaining its original form, or also made with a reduced diameter.

Advantageously, the connecting tube and/or the tube section are made as seamless, cold-drawn steel tubes. The use of seamless cold-drawn steel tubes as the starting material for the connecting tube and/or the tube section is particularly advantageous when the two joint partners are expanded in the connection zone to produce a frictional press fit connection. The tensile stress occurring in the connecting tube and the tube section during the expansion can be withstood particularly well by tubes whose circumference is not weakened by a seam. Advantageously, seamless cold-drawn precision steel tubes according to EN 10305-1 can be used, which have been heat treated by normalizing. The purpose of the normalizing heat treatment is for example to eliminate structural irregularities produced by work hardening during the cold-drawing. In this way a fine-grained, uniform structure with good deformation properties can be produced as the starting basis for the expansion of the connecting tube and the tube section.

According to an alternative embodiment the connecting tube and/or the tube section are in the form of longitudinally seam-welded steel tubes. The use of relatively inexpensive longitudinally seam welded steel tubes as the starting material for the connecting tube and/or the tube section is particularly to be considered when the two joint partners, in the connection zone, are to be compressed for the production of the frictional press fit. A heat treatment by annealing can improve the processing properties of longitudinally seam welded steel tubes. Even in a design with one tube section arranged in the area of a curved part of the connecting tube, longitudinally seam welded steel tubes are a possibility for the starting material, particularly when the radius of curvature is large. In such a case, care should be taken that the longitudinal weld seam is in the area of the neutral fiber. The neutral fiber is that layer of a bend cross-section whose length does not change during a bending process. There, the bending does not produce any tensile or compression stresses. Besides longitudinally seam welded steel tubes, spiral-seam-welded steel tubes are also suitable as the starting material for the connecting tube and/or the tube section.

The invention also relates to a method for producing a steering rod or track rod as previously described, wherein first of all a tube semifinished part of the tube section is positioned inside a tube semifinished part of the connecting tube, and then the two tubular semifinished parts are expanded by means of a mandrel with an oversize section which is moved along the common axial direction of the two tube semifinished parts. In this way a frictional press fit connection is produced between the two joint partners. In this context a tube semifinished part of the tube section or the connecting tube means the starting material for the tube section or connecting tube. Preferably, these are seamless, cold-drawn, straight steel tubes, each cut to the required length. Advantageously, the tube semifinished part of the tube section is positioned in the tube semifinished part of the connecting tube by means of a counterblock, which can be displaced within the tube semifinished part of the connecting tube and which acts as a stop. Between the tube semifinished part of the tube section and the semifinished part of the connecting tube there is preferably a clearance fit with a relatively small clearance gap, so that the two joint partners can be moved relative to one another without much force.

The expansion of the tube semifinished part of the tube section and the tube semifinished part of the connecting tube within the connection zone by means of a mandrel with an oversize section which is moved along the common axial direction of the two tube semifinished parts preferably takes place continuously in the axial direction. In this context a mandrel with an oversize section means that the mandrel has an outer diameter for example of 38 millimeters, which is larger than the inside diameter of the tube semifinished part of the tube section before it is expanded, which for example is 37 millimeters. The mandrel preferably does not have its oversize section along its full length but only along a relatively small part of its length, which is in the form of an annular ail-round bead. In this way the deformation force required for the expansion can be kept relatively small. Over the remainder of its length the mandrel essentially has free space around its circumference to avoid friction between the mandrel and the inside wall of the tube semifinished part of the tube section.

Due to the expansion within the connection zone, the tube semifinished part of the tube section becomes the tube section and the tube semifinished part of the connecting tube becomes the connecting tube. During the expansion of the tube section and the connecting tube, the connecting tube may be deformed elastically or plastically. Preferably, when the tube section is on the inside the expansion takes place in such manner that within the connection zone the connecting tube has some residual plastic deformation with a slight increase of its outer diameter. In such a case the inside and outer diameters of the tube section and the connecting tube within the connection zone are larger than outside the connection zone. The result of this procedure is that if the frictional press fit between the joint partners, the connecting tube and the tube section, should fail, the position is secured by a form-enclosing configuration that keeps the tube section inside the connecting tube in the axial direction.

Preferably the diameter of at least one end section of the connecting tube is reduced, this reduction taking place by means of a die with a conical inlet which is moved in the axial direction of the connecting tube, the die being pushed over the outer circumference of the connecting tube. On its side facing toward the connecting tube the die has a conical inlet with an opening angle preferably of 12 to 15 degrees. The die can be pushed onto the outer circumference of the connecting tube at its end once the mandrel has been pulled out of the connecting tube. Advantageously, the die is pushed on while the mandrel is still inserted in the connection tube, in such manner that in the area where the die is being pushed onto the connecting tube, the mandrel has an outer diameter that corresponds to the inside diameter of the end section whose diameter has been reduced. In this way any buckling of the connecting tube while the die is being pushed on can be counteracted.

Advantageously, the diameter reduction of the connecting tube takes place during the same clamping operation as the expansion of the tube semifinished part of the tube section and the semifinished part of the connecting tube. This is particularly favorable compared with separate working steps when the die is pushed on while the mandrel is still inserted in the connecting tube, as described before. Depending on the design of the connecting tube, a curved section can subsequently be produced by bending the connecting tube.

BRIEF DESCRIPTION OF THE DRAWINGS

Below, the invention is explained in more detail with reference to drawings that show embodiments presented only as examples, wherein the same indexes refer to the same components or elements. The figures show:

FIG. 6: An enlarged detailed view of the detail Y in FIG. 5.

DETAILED DESCRIPTION OF THE PREFERRED EMBODIMENTS

Figure 1:
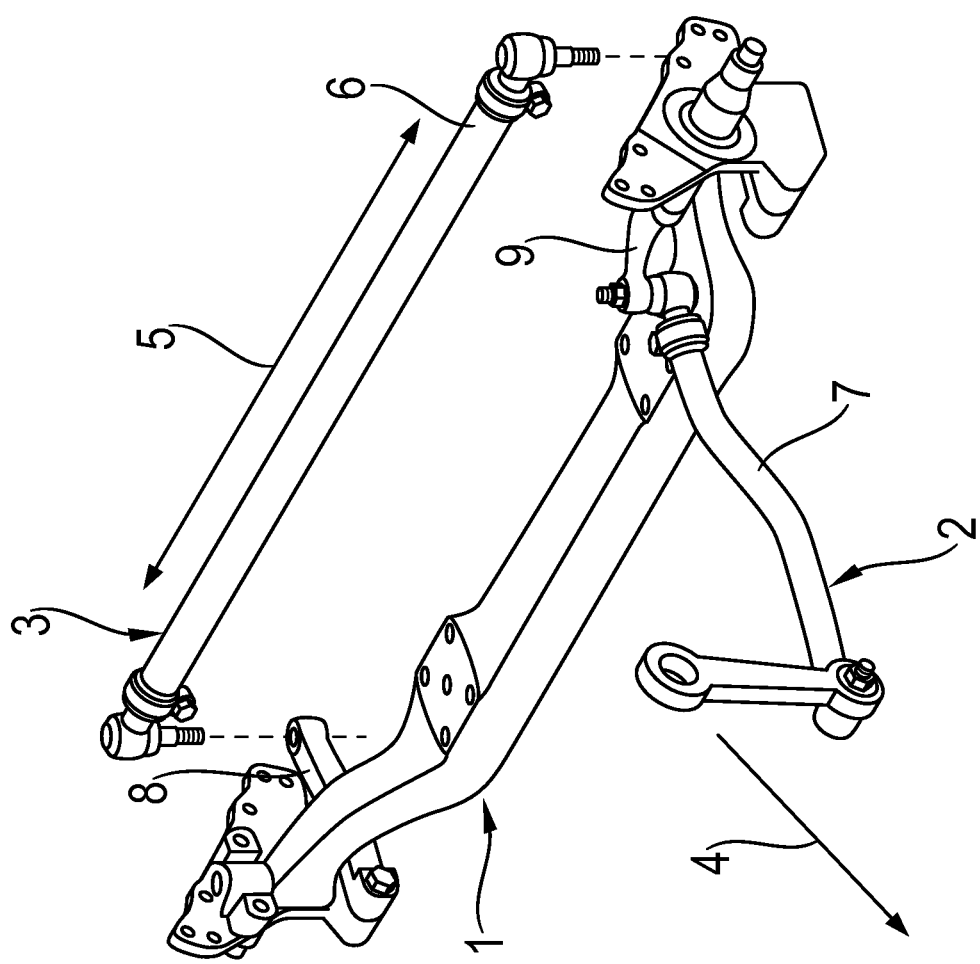
FIG. 1: A perspective view of a front axle of a utility vehicle, with steering components according to the prior art.

FIG. 1 shows a front axle 1 of a utility vehicle known from the prior art, having a steering linkage comprising a steering rod 2 and a track rod 3. The steering rod, orientated essentially in the longitudinal direction 4 of the vehicle, and the track rod 3, orientated essentially in the transverse direction 5 of the vehicle, are in functional connection by way of a lever arrangement. The track rod 3 has a straight connecting tube 6. The steering rod 2 has a curved connecting tube 7. The track rod extends in the transverse direction 5 of the vehicle and connects a track lever 8 of a wheel carrier on a first side of the vehicle to a track lever, obscured by another component, of the opposite wheel carrier on the other side of the vehicle. The steering rod 2 extends essentially in the longitudinal direction 4 and connects a lever of a steering gear system to a steering lever 9 associated with one of the two wheel carriers connected by the track rod 3.

Figure 2:
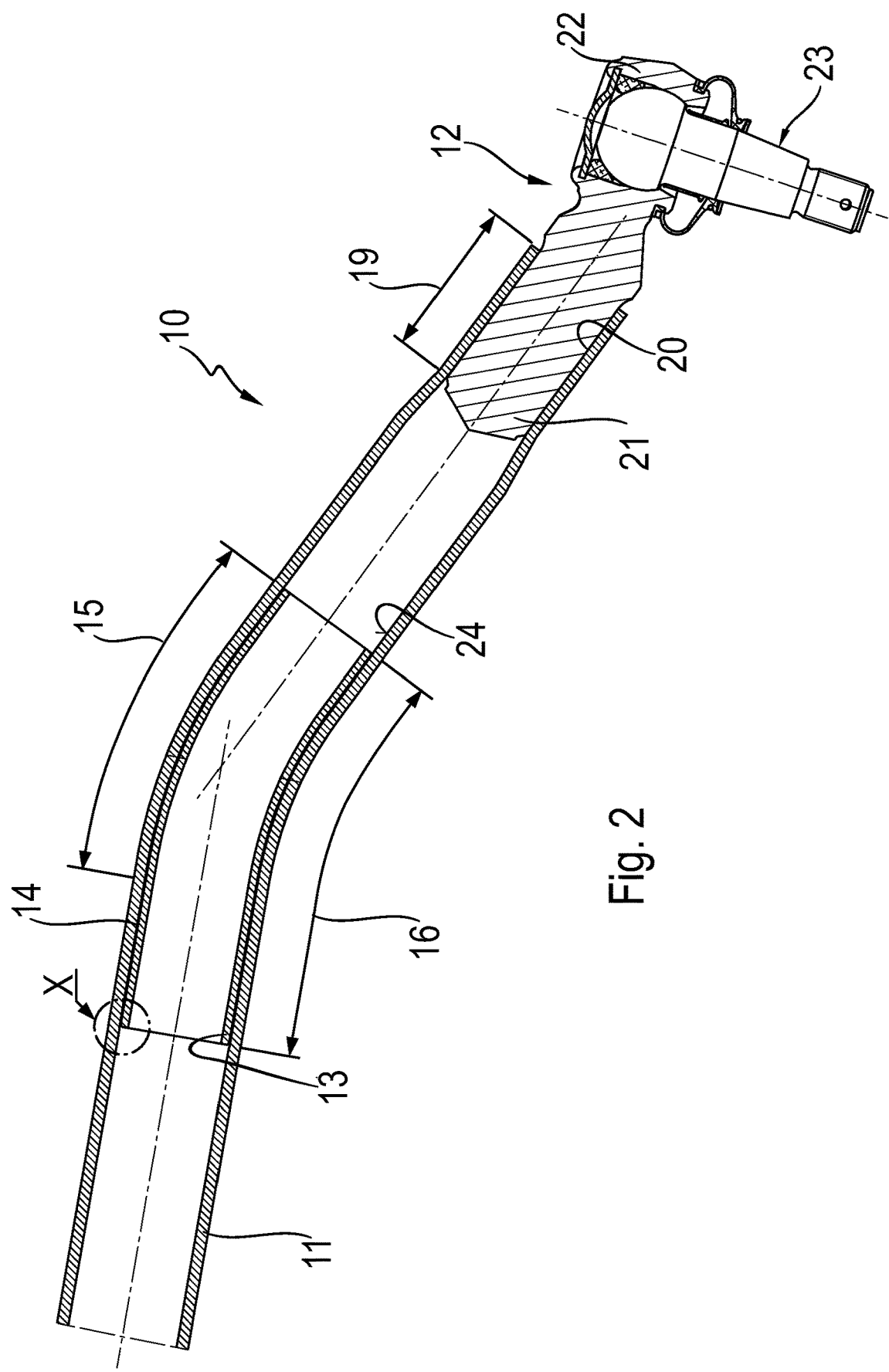
FIG. 2: A sectioned view of a steering rod with a curved connecting tube, according to a first embodiment of the invention.

FIG. 2 shows a steering rod 10 with a connecting tube 11 that connects two joint attachments of the steering rod 10 to one another, only one of the joint attachments 12 being shown in the figure. The joint attachment 12 is arranged at one end of the connecting tube 11. The connecting tube 11 is reinforced in one area by a tube section 13 connected to the connecting tube by friction force, such that the outer wall 14 of the tube section 13 is in contact all over its surface against the inside wall 24 of the connecting tube 11, forming a press fit connection. The length of the tube section 13 is shorter than the length of the connecting tube 11. Over their lengths the connecting tube 11 and the tube section 13 each have a constant, circular cross-sectional area, and the extension of the connecting tube 11 deviates from a straight line, forming a curved portion 15. The tube section 13 is arranged in the area of this curved portion 15 of the connecting tube 11. The connecting tube 11 and the tube section 13 are plastically deformed all round within a mutual connection zone 16 which is a distance away from the ends of the connecting tube 11.

Since the tube section 13 is in contact all over the surface of its outer wall 14 against the inside wall 24 of the connecting tube 11, forming a press fit connection, the length of the connection zone 16 corresponds to the length of the tube section 13. The connection zone 16 extends on one side beyond the curved section 15 in the direction toward one end of the connecting tube 11. Consequently, in addition to the curved area, namely the curved portion 15, the connecting tube 11 is also reinforced in a straight area adjacent to the curved portion 15. The material of the connecting tube 11 has a higher yield point than the material of the tube section 13, such that the yield point of the connecting tube material has a value of 460 MPa and that of the tube section material a value of 355 MPa. Thus, the difference between the two yield point values is 105 MPa.

Figure 3:
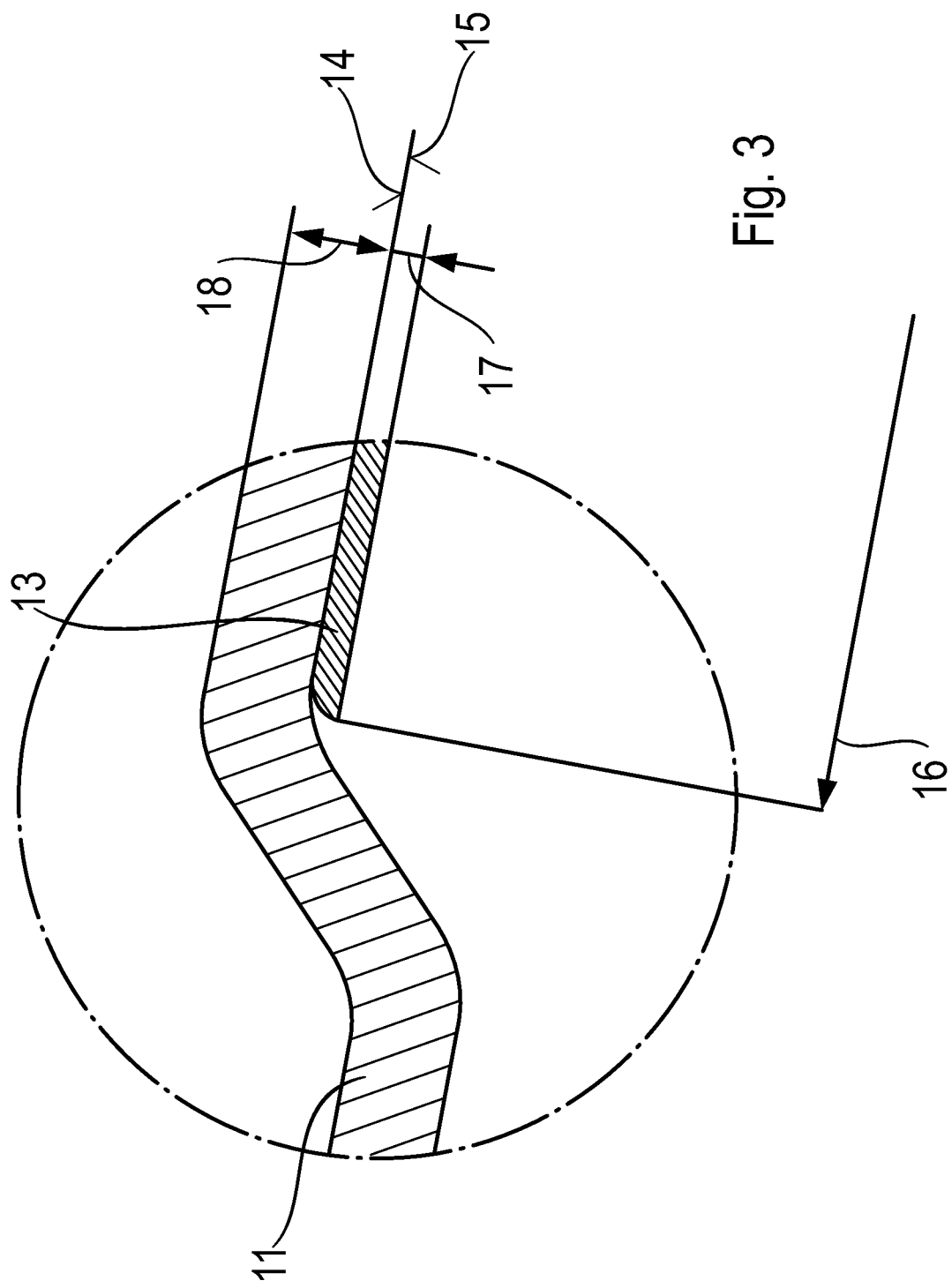
FIG. 3: An enlarged, not-to-scale detailed view of the detail X in FIG. 2.

The wall thickness 17 of the tube section 13 is smaller than the wall thickness 18 of the connecting tube 11. An end section 19 of the connecting tube 11 has a reduced diameter compared with the diameter of the connecting tube 11. Merging into its end section 19 of reduced diameter, the connecting tube 11 has an all-round conically shaped transition zone. The connection zone 16 and the end section 19 are at a distance away from one another. The end section 19 with reduced diameter has a grooved profile 20 not illustrated separately, with grooves uniformly apart in the axial direction. The joint attachment is in the form of a radial ball joint 12 with a shank 21. The shank 21 has a grooved profile whose shape matches that of the grooved profile 20 of the end section 19. The shank 21 is held all round by the end section 19, and is connected thereto by hot stamping. The radial ball joint 12 has a housing 22 in which a spherical end section of a ball stud 23 is arranged, with the ball stud 23 extending essentially at a right-angle to the extension direction of the end section 19 and the shank 21. The connecting tube 11 and the tube section 13 are in the form of seamless, cold-drawn precision steel tubes according to EN 10305-1, which undergo a normalizing heat treatment. As is made clear by FIG. 3, the transition zone from the sections of the connecting tube 11 not plastically deformed to the connection zone 16 is of conical shape all round.

Figure 4:
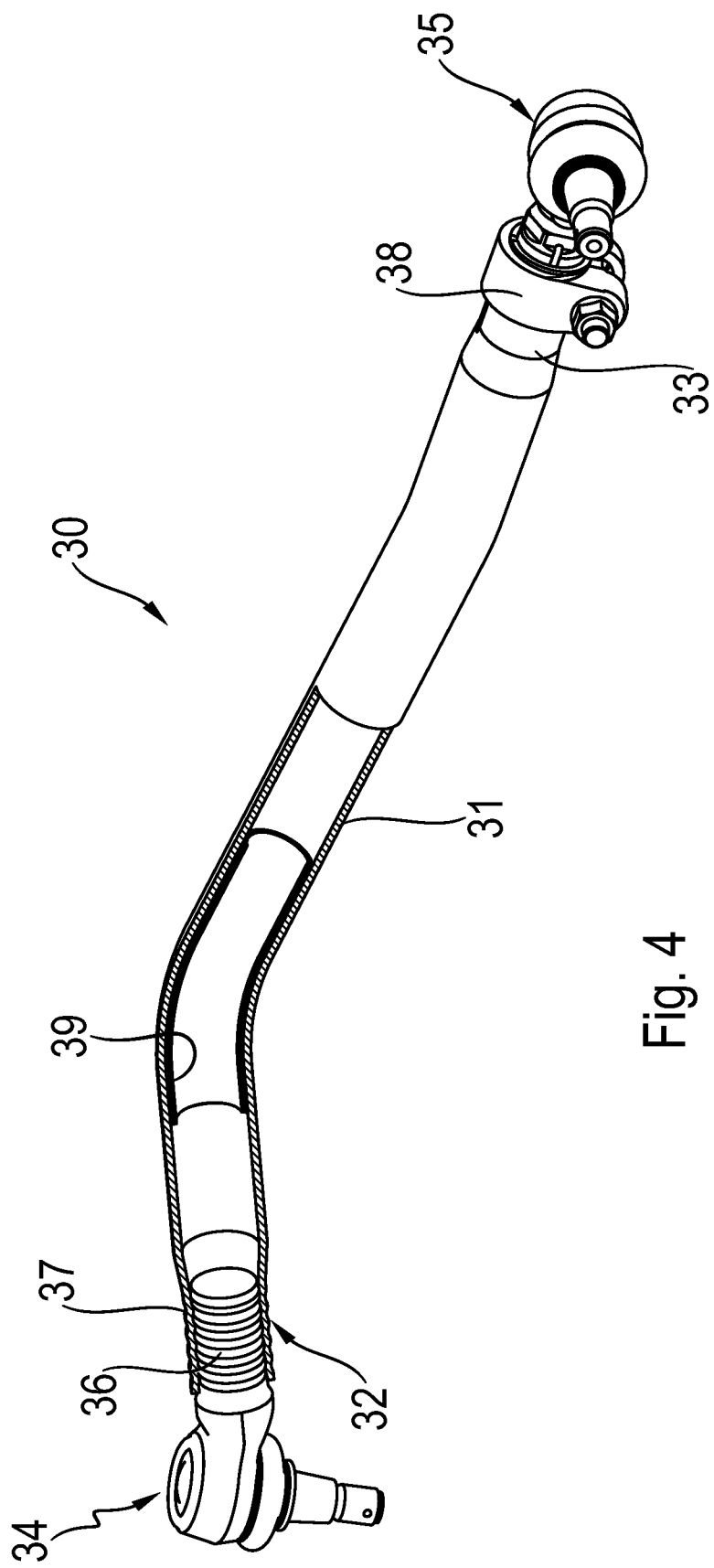
FIG. 4: Partially sectioned view of a steering rod with a curved connecting tube, according to a second embodiment of the invention.

FIG. 4 shows a steering rod 30 with a connecting tube 31, wherein the end sections 32, 33 of the connecting tube 31 each hold parts of joint attachments 34, 35. The joint attachments are in the form of radial ball joints 34, 35, and in each case a shank 36 of the radial ball joint 34, 35 is held by the associated end section 32, 33 of the connecting tube 31. The shank 36 and the end section 32 are connected permanently to one another by a grooved profile 37 with grooves parallel to one another and spaced uniformly apart in the axial direction of the shank 36 and the end section 32. One of the two radial ball joints 35 is connected to the connecting tube 31 in such manner that it can be moved in the axial direction of the end section 33, in order to enable fine adjustment of the distance apart from one another of the radial ball joints 34, 35. The fine adjustment is in this case carried out by virtue of a thread arrangement which enables axial displacement of the (not visible) shank relative to the end section 33 of the connecting tube 31. After fine adjustment, the set position of the radial ball joint 35 relative to the connecting tube 31 can be secured by a clamp 38 that encloses the end section 33 of the connecting tube 31. The end section 33 of the connecting tube 31 has two longitudinal slots in order to provide some yield and thereby to enable clamping by the clamp 38. The connecting tube 31 has a shape that deviates from straightness. In one area the connecting tube 31 is reinforced by a tube section 39 connected by friction to the connecting tube 31, with the tube section 39 in contact over its entire outer wall surface against the inside wall of the connecting tube 31, forming a press fit connection.

Figure 5:
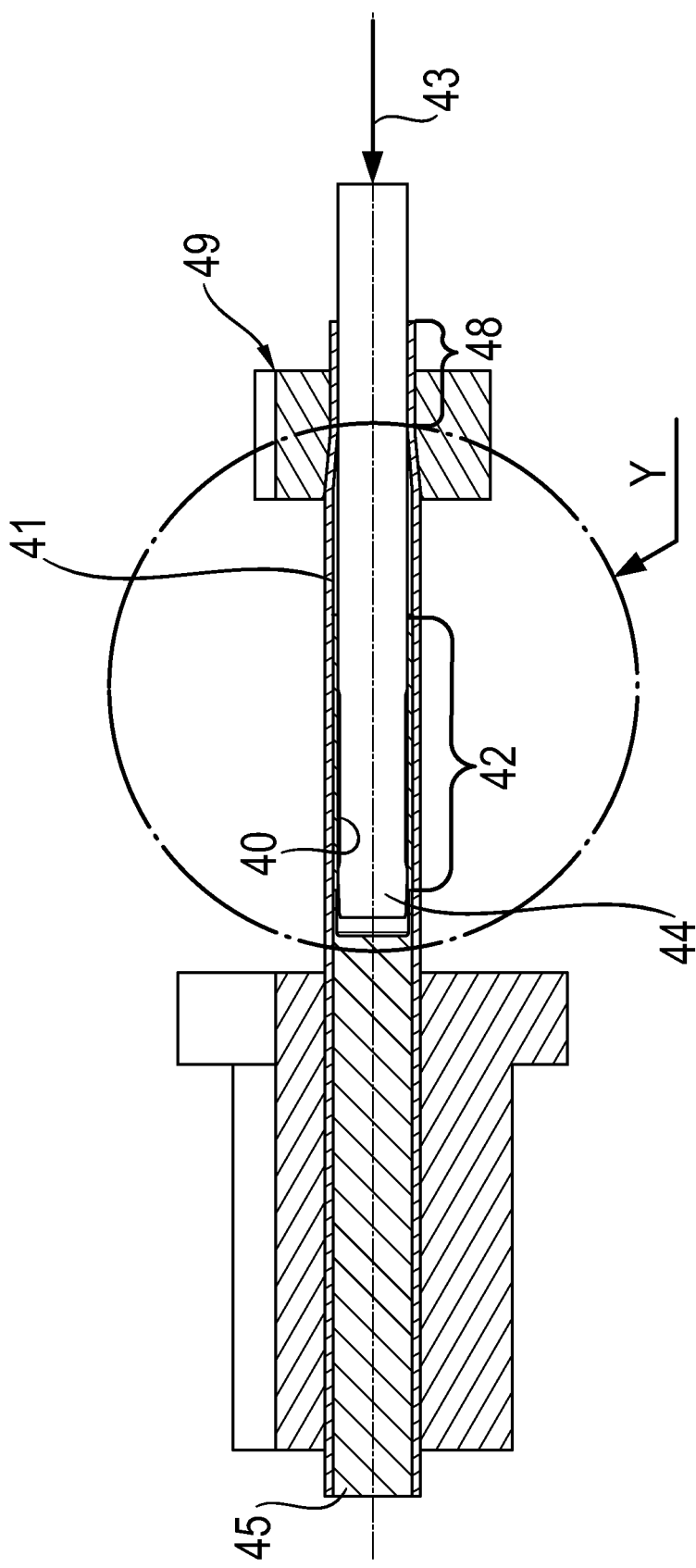
FIG. 5: Schematic representation of a method for producing a connecting tube of a steering rod according to a third embodiment.

FIG. 5 illustrates a method for producing a connecting tube 41 of a steering rod, wherein a tube semifinished part of a tube section 40 is positioned inside a tube semifinished part of the connecting tube 41 and the two tube semifinished parts are then expanded within a connection zone 42 by a mandrel 44 with an oversize section which is moved in the common axial direction 43 of the two tube semifinished parts. In this way a frictional press fit is formed between the two mating parts. The tube semifinished parts are straight, seamless, cold-drawn steel tubes, each cut to the required length. The tube semifinished part of the tube section 40 is positioned in the tube semifinished part of the connecting tube 41 by means of a counterblock 45 that can be pushed into the tube semifinished part of the connecting tube 41, which acts as a stop and can be seen in FIG. 6. Between the tube semifinished part of the tube section 40 and the tube semifinished part of the connecting tube 41 there is preferably a clearance fit with a relatively small clearance gap, so that the two joint partners can be moved relative to one another without much force.

The expansion of the tube semifinished part of the tube section 40 and the semifinished part of the connecting tube 41 within the connection zone 42 by means of the oversize mandrel 44 moving in the common axial direction 43 of the two semifinished parts 40, 41 preferably takes place continuously in the axial direction 43. The mandrel 44 is not oversized over its full length in the axial direction 43, but only in a relatively small area of its length which is in the form of an annular bead 46. In this way the deforming force required for the expansion can be kept relatively small. Over the rest of its length the mandrel 44 has essentially a circumferential clearance 47 in order to minimize the friction between the mandrel 44 and the inside wall of the tube semifinished part of the tube section 40. When the tube semifinished part of the tube section 40 is on the inside, the expansion takes place in such manner that within the connection zone 42, the tube semifinished part of the tube section 40 and the tube semifinished part of the connecting tube 41 undergo a residual plastic deformation along with a slight increase of their respective outer diameters. The result of this procedure is that in the event of failure of the frictional press fit between the joint partners, the position is secured by a form-enclosing action that once the connecting tube 41 has been finished, keeps the tube section 40 in position in the axial direction 43 within the connecting tube 41.

An end section 48 of the connecting tube 41 has its diameter reduced, this diameter reduction taking place by means of a die 49 with a conical inlet 50 moving in the axial direction 43, the die 49 being pushed over the outer circumference of the connecting tube 41. On its side facing toward the connecting tube 41, the die 49 has a conical inlet 50 with an opening angle of 14 degrees. The die 49 is pushed on with the mandrel 44 inserted in the connecting tube 41, and in the area where the die 49 is pushed onto the connecting tube 41 the mandrel 44 has an outer diameter that corresponds to the inside diameter of the end section 48 with the reduced diameter. In this way any buckling of the connecting tube 41 while the die 49 is being pushed on can be counteracted. The diameter reduction of the connecting tube 41 takes place during the same clamping operation as the expansion of the tube semifinished part of the tube section 40 and the tube semifinished part of the connecting tube 41. Over its length, the connecting tube 41 is straight.

INDEXES

1 Front axle
2 Steering rod
3 Track rod
4 Longitudinal direction of the vehicle
5 Transverse direction of the vehicle
6 Connecting tube of the track rod
7 Connecting tube of the steering rod
8 Track lever
9 Steering lever
10 Steering rod
11 Connecting tube
12 Joint attachment
13 Tube section
14 Outer wall of the tube section
15 Curved portion
16 Connection zone
17 Wall thickness of the tube section
18 Wall thickness of the connecting tube
19 End section
20 Grooved profile
21 Shank
22 Housing
23 Ball stud
24 Inside wall of the connecting tube
30 Steering rod
31 Connecting tube
32 End section
33 End section
34 Joint attachment, radial ball joint
35 Joint attachment, radial ball joint
36 Shank
37 Grooved profile
38 Clamp
39 Tube section
40 Tube section
41 Connecting tube
42 Connection zone
43 Axial direction
44 Mandrel
45 Counterblock
46 Bead
47 Clearance
48 End section
49 Die
50 Conical inlet

The invention claimed is:

1. A steering rod or a track rod comprising:
a hollow connecting tube having a first end section and an opposed second end section with first and second respective ends having a reduced diameter,
each of the reduced diameters of the first and the second end sections of the connecting tube supporting a respective joint attachment component,
the connecting tube being reinforced, in at least one area spaced away from and between the reduced diameters of the first and the second end sections, by a hollow tube section which is connected by friction to an inwardly facing surface of the connecting tube, and
the tube section being in contact, over an entire surface of its outer wall or, against a wall of the connecting tube and thereby forming a press fit connection with the connecting tube.

2. The steering rod or the track rod according to claim 1, wherein the connecting tube is straight over its entire length.

3. The steering rod or the track rod according to claim 1, wherein a shape of the connecting tube deviates from straightness along its length.

4. The steering rod or track rod according to claim 3, wherein the tube section is arranged in an area of a curved portion of the connecting tube.

5. The steering rod or the track rod according to claim 1, wherein the connecting tube or the tube section undergoes all-round radial plastic deformation within a mutual connection zone, and the connection zone is spaced away from the reduced diameter end sections of the connecting tube.

6. The steering rod or the track rod according to claim 1, wherein the connecting tube and the tube section undergo all-round radial plastic deformation within a mutual connection zone, and the connection zone is spaced away from the reduced diameter end sections of the connecting tube.

7. The steering rod or the track rod according to claim 1, wherein a material from which the connecting tube is manufactured from and a material from which the tube section is manufactured from have different yield strengths.

8. The steering rod or the track rod according to claim 7, wherein the material of the connecting tube has a higher yield strength than the material of the tube section.

9. The steering rod or the track rod according to claim 1, wherein a wall thickness of the tube section is smaller than a wall thickness of the connecting tube.

10. The steering rod or the track rod according to claim 1, wherein at least one of the connecting tube and the tube section is in a form of a seamless, cold-drawn steel tube.

11. The steering rod or the track rod according to claim 1, wherein at least one of the connecting tube and the tube section is in a form of a longitudinally seam-welded steel tube.

12. The steering rod or the track rod according to claim 1, wherein the tube section has a thinner wall thickness than a wall thickness of the connecting tube and the connecting tube is manufactured from a material which has a higher yield point than a material from which the tube section is manufactured.

13. The steering rod or the track rod according to claim 12, wherein the connecting tube material has a yield point value of about 460 MPa and the tube section has a yield point value of about 355 MPa.

14. A steering rod or a track rod comprising;
   a hollow connecting tube having first and second reduced diameter end sections, and each of the reduced diameter end sections of the connecting tube supporting a respective first or second shank,
   an area of the connecting tube, spaced from both of the first and the second reduced diameter end sections, being reinforced by a hollow tube section,
   the hollow tube section having a thinner wall thickness than a wall thickness of the hollow connecting tube, and the connecting tube being manufactured from a material having a higher yield point than a material from which the tube section is manufactured,
   the hollow tube section being expanded radially outwardly, during fabrication by a mandrel, toward an inwardly facing surface of the hollow connecting tube in such manner that, within a connection zone, the hollow tube section and the hollow connecting tube both undergo a residual plastic deformation along with a slight increase of each of their respective outer diameters, and
   an entirety outer surface of the hollow tube section being in contact with an interior surface of the hollow connecting tube, forming a press fit connection between the hollow tube section and the hollow connecting tube.

15. The steering rod or the track rod according to claim 14, wherein at least the first reduced diameter end section of the connecting tube is permanently attached to the first shank, and both the first reduced diameter end section and the first shank have mating grooved profiles with grooves which extend parallel to one another and are spaced uniformly apart from one another in an axial direction of the first shank and the first reduced diameter end section.

16. The steering rod or the track rod according to claim 15, wherein the second reduced diameter end section of the connecting tube has a threaded section and the second shank has a mating thread, and a fine adjustment is carried out by rotation of the second shank, relative to the second reduced diameter end section, and a clamp is provided for retaining desired adjustment.

* * * * *